(12) United States Patent
Habif

(10) Patent No.: US 8,433,070 B2
(45) Date of Patent: Apr. 30, 2013

(54) SYSTEMS AND METHODS FOR STABILIZATION OF INTERFEROMETERS FOR QUANTUM KEY DISTRIBUTION

(75) Inventor: Jonathan Lenahan Habif, Arlington, MA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 427 days.

(21) Appl. No.: 12/781,446

(22) Filed: May 17, 2010

(65) Prior Publication Data
US 2011/0280405 A1 Nov. 17, 2011

(51) Int. Cl.
G06F 12/14 (2006.01)
H04L 9/00 (2006.01)
H04L 9/08 (2006.01)

(52) U.S. Cl.
USPC ............... 380/278; 380/44; 380/52; 380/279

(58) Field of Classification Search .................. None
See application file for complete search history.

(56) References Cited

U.S. PATENT DOCUMENTS

| | | | |
|---|---|---|---|
| 5,675,648 A | 10/1997 | Townsend | |
| 6,160,627 A | 12/2000 | Ahn et al. | |
| 6,438,234 B1 | 8/2002 | Gisin et al. | |
| 7,068,790 B1 | 6/2006 | Elliott | |
| 7,324,647 B1 | 1/2008 | Elliott | |
| 7,346,166 B2 | 3/2008 | Inoue et al. | |
| 7,627,126 B1 | 12/2009 | Pikalo et al. | |
| 2003/0002670 A1* | 1/2003 | Wang | 380/52 |
| 2007/0133004 A1* | 6/2007 | Duplain et al. | 356/491 |
| 2009/0185689 A1* | 7/2009 | Beal | 380/278 |
| 2011/0032532 A1* | 2/2011 | Hirano et al. | 356/491 |
| 2011/0075839 A1* | 3/2011 | Noh | 380/44 |

OTHER PUBLICATIONS

Bogdanski, J. et al., "Sagnac Quantum Key Distribution Over Telecom Fiber Networks," Optics Communications 282, 2009, pp. 1231-1236.
Liu, X. et al., "Intrinsically Stable Phase-Modulated Polarization Encoding System for Quantum Key Distribution," Physics Letters A 373, 2008, pp. 54-57.
Liu, Y. et al., "High-Birefringence Fiber Loop Mirrors and Their Applications as Sensors," Applied Optics, vol. 44, No. 12, Apr. 20, 2005, pp. 2382-2390.

* cited by examiner

*Primary Examiner* — Shin-Hon Chen
(74) *Attorney, Agent, or Firm* — Ropes and Gray LLP

(57) ABSTRACT

Systems and methods are described in which both a quantum key distribution (QKD) transmitter and QKD receiver may keep both of their two-path interferometers stable, with regard to path length drift, relative to an internal reference laser are described. Systems and methods are also proposed whereby the transmitter interferometer may have only a single path (e.g., Sagnac interferometers). The systems and methods described herein may greatly improve the performance of quantum cryptographic transceivers that may make use of these systems and methods.

20 Claims, 11 Drawing Sheets

SYSTEMS AND METHODS FOR STABILIZATION OF INTERFEROMETERS FOR QUANTUM KEY DISTRIBUTION

GOVERNMENT CONTRACT

The U.S. Government has a paid-up license in this invention and the right in limited circumstances to require the patent owner to license others on reasonable terms as provided for by the terms of Contract No. H98230-09-C-0279, awarded by the National Security Agency.

RELATED APPLICATIONS

The present application relates to commonly assigned U.S. patent application Ser. No. 09/943,709, now U.S. Pat. No. 7,068,790, entitled "Systems and Methods for Path Set-up in a Quantum Key Distribution Network" and filed Aug. 31, 2001; commonly assigned U.S. patent application Ser. No. 09/944,328, now U.S. Pat. No. 7,324,647, entitled "Quantum Cryptographic Key Distribution Networks with Untrusted Switches" and filed Aug. 31, 2001, and commonly assigned U.S. patent application Ser. No. 10/716,078, now U.S. Pat. No. 7,627,126, entitled "Systems and Methods For Implementing Path Length Control For Quantum Cryptographic Systems" and filed Nov. 21, 2003, the disclosures of which are hereby incorporated herein by reference.

FIELD OF THE INVENTION

The present invention relates generally to cryptographic systems and, more particularly, to systems and methods for implementing actively and passively stabilized interferometers for quantum key distribution (QKD) transceivers.

BACKGROUND OF THE INVENTION

Within the field of cryptography, it is well recognized that the strength of any cryptographic system depends, among other things, on the key distribution technique employed. For conventional encryption to be effective, such as a symmetric key system, two communicating parties must share the same key and that key must be protected from access by others. The key must, therefore, be distributed to each of the parties. FIG. 1 shows one form of a conventional key distribution process. As shown in FIG. 1, for a party, Bob, to decrypt ciphertext encrypted by a party, Alice, Alice or a third party must share a copy of the key with Bob. This distribution process can be implemented in a number of conventional ways including the following: 1) Alice can select a key and physically deliver the key to Bob; 2) a third party can select a key and physically deliver the key to Bob; 3) if Alice and Bob both have an encrypted connection to a third party, the third party can deliver a key on the encrypted links to Alice and Bob; 4) if Alice and Bob have previously used an old key, Alice can transmit a new key to Bob by encrypting the new key with the old; and 5) Alice and Bob may agree on a shared key via a one-way mathematical algorithm, such as Diffie-Helman key agreement. All of these distribution methods are vulnerable to interception of the distributed key by an eavesdropper Eve, or by Eve "cracking" the supposedly one-way algorithm. Eve can eavesdrop and intercept or copy a distributed key and then subsequently decrypt any intercepted ciphertext that is sent between Bob and Alice. In conventional cryptographic systems, this eavesdropping may go undetected, with the result being that any ciphertext sent between Bob and Alice is compromised.

To combat these inherent deficiencies in the key distribution process, researchers have developed a key distribution technique called quantum cryptography. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, like Eve, from copying or intercepting a key that has been distributed from Alice to Bob without a significant probability of Bob's or Alice's discovery of the eavesdropping.

A well known quantum key distribution (QKD) scheme involves a quantum channel, through which Alice and Bob send keys using polarized or phase encoded photons, and a public channel, through which Alice and Bob send ordinary messages. Since these polarized or phase encoded photons are employed for QKD, they are often termed QKD photons. The quantum channel is a transmission medium that isolates the QKD photons from interaction with the environment. The public channel may comprise a channel on any type of communication network such as a Public Switched Telephone network, the Internet, or a wireless network. An eavesdropper, Eve, may attempt to measure the photons on the quantum channel. Such eavesdropping, however, will induce a measurable disturbance in the photons in accordance with the Heisenberg uncertainty principle. Alice and Bob use the public channel to discuss and compare the photons sent through the quantum channel. If, through their discussion and comparison, they determine that there is no evidence of eavesdropping, then the key material distributed via the quantum channel can be considered completely secret.

FIGS. 2 and 3 illustrate a well-known scheme 200 for quantum key distribution in which the polarization of each photon is used for encoding cryptographic values. To begin the quantum key distribution process, Alice generates random bit values (e.g., quantum bits) and bases 205 and then encodes the bits as polarization states (e.g., 0°, 45°, 90°, 135°) in sequences of photons transmitted via the quantum channel 210 (see row 1 of FIG. 3). Alice does not tell anyone the polarization of the photons she has transmitted. Bob receives the photons, decodes them, and measures their polarization along either a rectilinear or diagonal basis with randomly selected and substantially equal probability. Bob records his chosen basis (see row 2 of FIG. 3) and his measurement results (see row 3 of FIG. 3). Bob and Alice discuss 215, via the public channel 220, which basis he has chosen to measure each photon. Bob, however, does not inform Alice of the result of his measurements. Alice tells Bob, via the public channel, whether he has made the measurement along the correct basis (see row 4 of FIG. 3). In a process called "sifting" 225, both Alice and Bob then discard all cases in which Bob has made the measurement along the wrong basis and keep only the ones in which Bob has made the measurement along the correct basis (see row 5 of FIG. 3).

Alice and Bob then estimate 230 whether Eve has eavesdropped upon the key distribution. To do this, Alice and Bob must agree upon a maximum tolerable error rate. Errors can occur due to the intrinsic noise of the quantum channel and eavesdropping attack by a third party. Alice and Bob choose randomly a subset of photons m from the sequence of photons that have been transmitted and measured on the same basis.

For each of the m photons, Bob announces publicly his measurement result. Alice informs Bob whether his result is the same as what she had originally sent. They both then compute the error rate of the m photons and, since the measurement results of the m photons have been discussed publicly, the polarization data of the m photons are discarded. If the computed error rate is higher than the agreed upon tolerable error rate (typically no more than about 15%), Alice and Bob infer that substantial eavesdropping has occurred. They then discard the current polarization data and start over with a new sequence of photons. If the error rate is acceptably small, Alice and Bob adopt the remaining polarizations or some algebraic combination of their values as secret bits of a shared secret key 235, interpreting horizontal or 45 degree polarized photons as binary 0's and vertical or 135 degree photons as binary 1's (see row 6 of FIG. 3).

Alice and Bob may also implement an additional privacy amplification process 240 that reduces the key to a small set of derived bits to reduce Eve's knowledge of the key. If, subsequent to discussion 215 and sifting 225, Alice and Bob adopt n bits as secret bits, the n bits can be compressed using, for example, a hash function. Alice and Bob agree upon a publicly chosen hash function $f$ and take $K=f(n \text{ bits})$ as the shared r-bit length key K. The hash function randomly redistributes the n bits such that a small change in bits produces a large change in the hash value. Thus, even if Eve determines a number of bits of the transmitted key through eavesdropping, and also knows the hash function $f$, she still will be left with very little knowledge regarding the content of the hashed r-bit key K. Alice and Bob may further authenticate the public channel transmissions to prevent a "man-in-the-middle" attack in which Eve masquerades as either Bob or Alice.

QKD may be implemented by using two fiber optic interferometers each for encoding or decoding bits (also known as quantum bits, qubits, or symbols) of information on a photon at a transmitter and a receiver, respectively. A transmitter and a receiver interferometer may each have two paths and/or two arms (e.g., a Mach-Zehnder Interferometer, MZI). Encoding or decoding of a quantum bit for QKD may require two pulses, e.g., a reference pulse and a phase-encoded pulse. A two-path transmitter interferometer may have optical quantum pulses (or fields) that traverse the two paths of the interferometer. In such a transmitter interferometer, the optical path length of one of the paths may be tunable to encode a phase on the optical pulse traversing that path. Similarly, a two-path receiver interferometer may have optical pulses (or fields) that traverse the two paths of the interferometer. In such a receiver interferometer, the optical length of one of the paths may be tunable to decode a phase of the optical pulse traversing that path. In such transmitter and receiver interferometers, there may be no path length control. In these cases, the relative path lengths of the two paths and/or two arms of each of the interferometers may drift unabated and errantly due to temperature fluctuations, vibration, and other such noise in each of the interferometers or the quantum channel. Such drift may cause the relative phase between the two pulses that may be required to encode or decode quantum bits, to also drift unabated and errantly. Such drift may result in a reduction of the fidelity (i.e., errors) of quantum bits transmitted or received in the quantum channel and may also reduce the rate at which secret keys may be shared.

There may be multiple approaches to account for this drift in these relative path lengths. An approach that allows the receive interferometer, at the receiver, to calibrate itself and change its path length to match that of the drifting transmit interferometer may be disadvantageous. In particular, this approach may require that the encoded quantum bits, usually used for making a key, to instead be used to gather information about the drift in the relative path lengths at the transmit interferometer in order to calibrate the receive interferometer. This approach may be inefficient due to the waste of limited channel bandwidth caused by the increased overhead of such a calibration process. Accordingly, there is a need for systems and methods that may account for, reduce, or eliminate the drift in the relative path lengths at the transmitter and/or receiver interferometers that is more efficient and that may not waste limited channel bandwidth. In addition, there is a need for such systems and methods that reduce errors that may be caused when quantum bits are transmitted or received in a quantum channel.

SUMMARY OF THE INVENTION

Accordingly, systems and methods for active stabilization of the optical path length of a two-path/two-arm interferometer (e.g., a Mach-Zehnder interferometer), which may commonly be used for the encoding and decoding of optical quantum bits in a fiber-optic QKD transmitters or receiver are described. Optical path length drift of optical fiber may occur under conditions of vibration or temperature fluctuation. Without stabilization, this may result in noise that reduces the fidelity of the quantum bits transmitted, and ultimately may reduce the rate at which a secret key may be shared by QKD transceivers. Such stabilization may include monitoring the relative path lengths of the two paths of the interferometer with a calibration laser, and may measure the output intensity using a power meter/sensor. If the measured intensity at the power meter/sensor of the interferometer fluctuates, an electrical feedback signal may be generated to adjust the relative path lengths of the two arms of the interferometer. Such systems and methods may substantially reduce or eliminate optical path length drift that may otherwise occur in some two-path interferometer systems and methods.

Systems and methods for passive stabilization of interferometers that may be used in a transceiver are also described. A phase-encoding transmitter for fiber optic quantum key distribution (QKD) with a one-path interferometer (e.g., a Sagnac interferometer) is described. An interferometer which may include a photonic crystal fiber, which may have a high value of birefringence, and which may be in a Sagnac configuration is described. Because a phase-encoded quantum bit for QKD may include a reference pulse and a phase-encoded pulse, these two pulses may be generated by a clockwise rotating pulse and counterclockwise rotating pulse in the transmitter and the interferometer that is described. Such a one-path transmitter interferometer may substantially reduce or eliminate optical path length drift that may occur in some two-path interferometer systems and methods.

The systems and methods described herein may substantially reduce or eliminate the drift that may occur in a two path interferometer. The systems and methods described herein may also alleviate the need for wasting precious channel bandwidth for unnecessary calibration of a receiver interferometer to account for the drift. In addition, the systems and methods described herein may reduce errors that may be caused when quantum bits are transmitted or received. Therefore, the systems and methods described herein may greatly improve the performance of QKD transceivers that may make use of these systems and methods.

In one aspect, quantum cryptographic key distribution systems and methods which may include an interferometer including two paths and a phase modulator configured to transmit, at a first wavelength, symbols over a quantum channel are described. Each of the two paths of the interferometer may be associated, respectively, with a first and a second path length. The system may include a calibration laser which may transmit, at a second wavelength, a calibration signal. The system may also include a power sensor that may measure an intensity of the calibration signal. The interferometer may adjust at least one of the first path length and the second path length based on the measured intensity of the calibration signal.

In some embodiments quantum cryptographic key distribution systems and methods which may include an interferometer including two paths and a phase modulator configured to receive, at a first wavelength, symbols over a quantum channel are described. Each of the two paths of the interferometer may be associated, respectively, with a first and a second path length. The system may include a calibration laser which may transmit, at a second wavelength, a calibration signal. The system may also include a power sensor that may measure an intensity of the calibration signal. The interferometer may adjust at least one of the first path length and the second path length based on the measured intensity of the calibration signal.

In another aspect, a quantum cryptographic key distribution systems and methods which may include a pulsed laser source to transmit a pulse and an interferometer are described. The interferometer may include a non-polarizing beam splitter that may split the pulse into a clockwise pulse and a counterclockwise pulse. The interferometer may include a polarization rotator configured to rotate a polarization of the counterclockwise pulse to produce a polarized counterclockwise pulse. The interferometer may include a polarization-maintaining photonic crystal fiber configured to delay one of the clockwise pulse and the polarized counterclockwise pulse relative to the other one of the clockwise pulse and the polarized counterclockwise pulse. The interferometer may include an active birefringence modulator to phase encode a symbol on one of the clockwise pulse and the polarized counterclockwise pulse. Each of the clockwise and counterclockwise pulses may be output as one of a phase-encoded pulse and a reference pulse.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

Systems and methods are described in which one or both of a QKD transmitter and QKD receiver may keep their interferometers stable, with regard to path length drift, relative to an internal reference laser are described. This approach may alleviate the need for wasting precious channel bandwidth for calibrating a receiver interferometer, to account for the drift at the transmitter interferometer, while also substantially reducing or substantially eliminating drift (caused by, e.g., temperature fluctuations and vibrations in the interferometers or the quantum channel) between the path lengths of the two paths of transceiver interferometers. Systems and methods are proposed whereby the transmitter interferometer may have only a single path (e.g., Sagnac interferometers). This approach may substantially eliminate the drift that may occur in a two path interferometer by allowing pulses to take only a single path. The systems and methods described herein may greatly improve the performance of quantum cryptographic transceivers that may make use of these systems and methods.

The following detailed description of the invention refers to the accompanying drawings. The same reference numbers in different drawings identify the same or similar elements. Also, the following detailed description does not limit the invention. Instead, the scope of the invention is defined by the appended claims.

Exemplary Network

Figure 1:
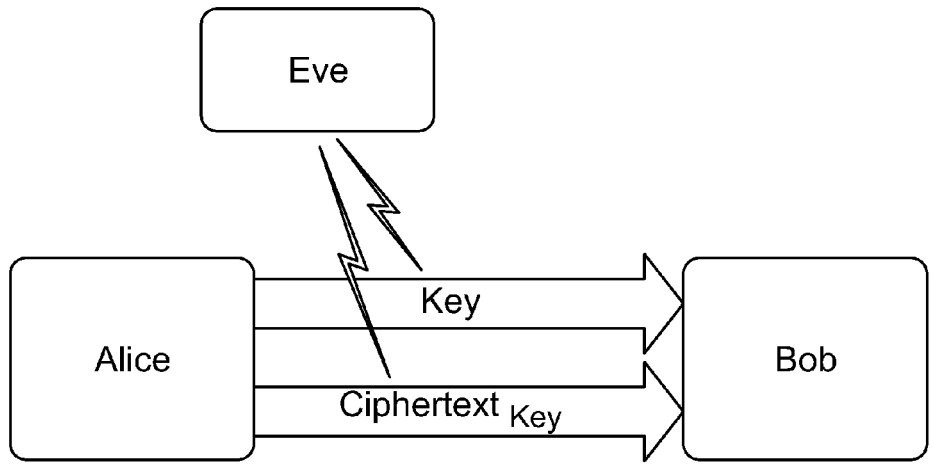
FIG. 1 illustrates conventional cryptographic key distribution and ciphertext communication.
Figure 2:
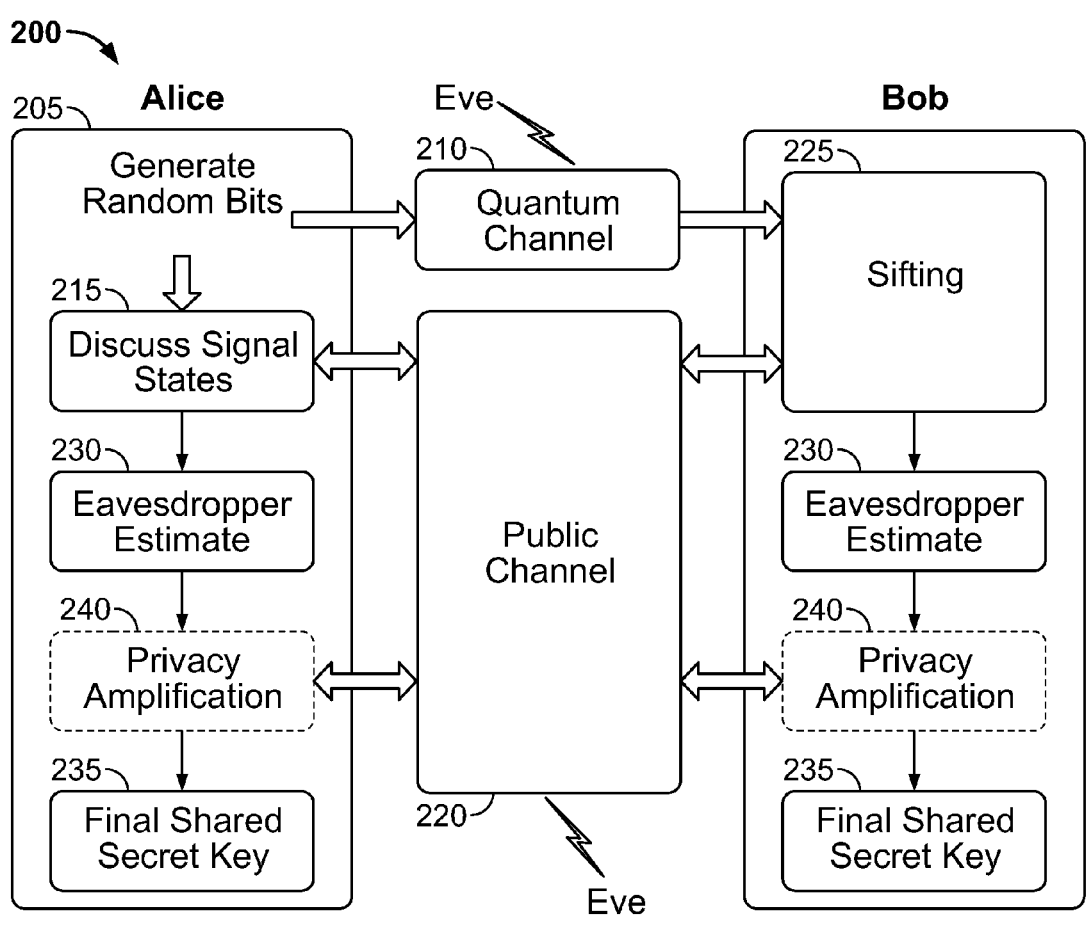
FIG. 2 illustrates a conventional quantum cryptographic key distribution (QKD) process.
Figure 3:
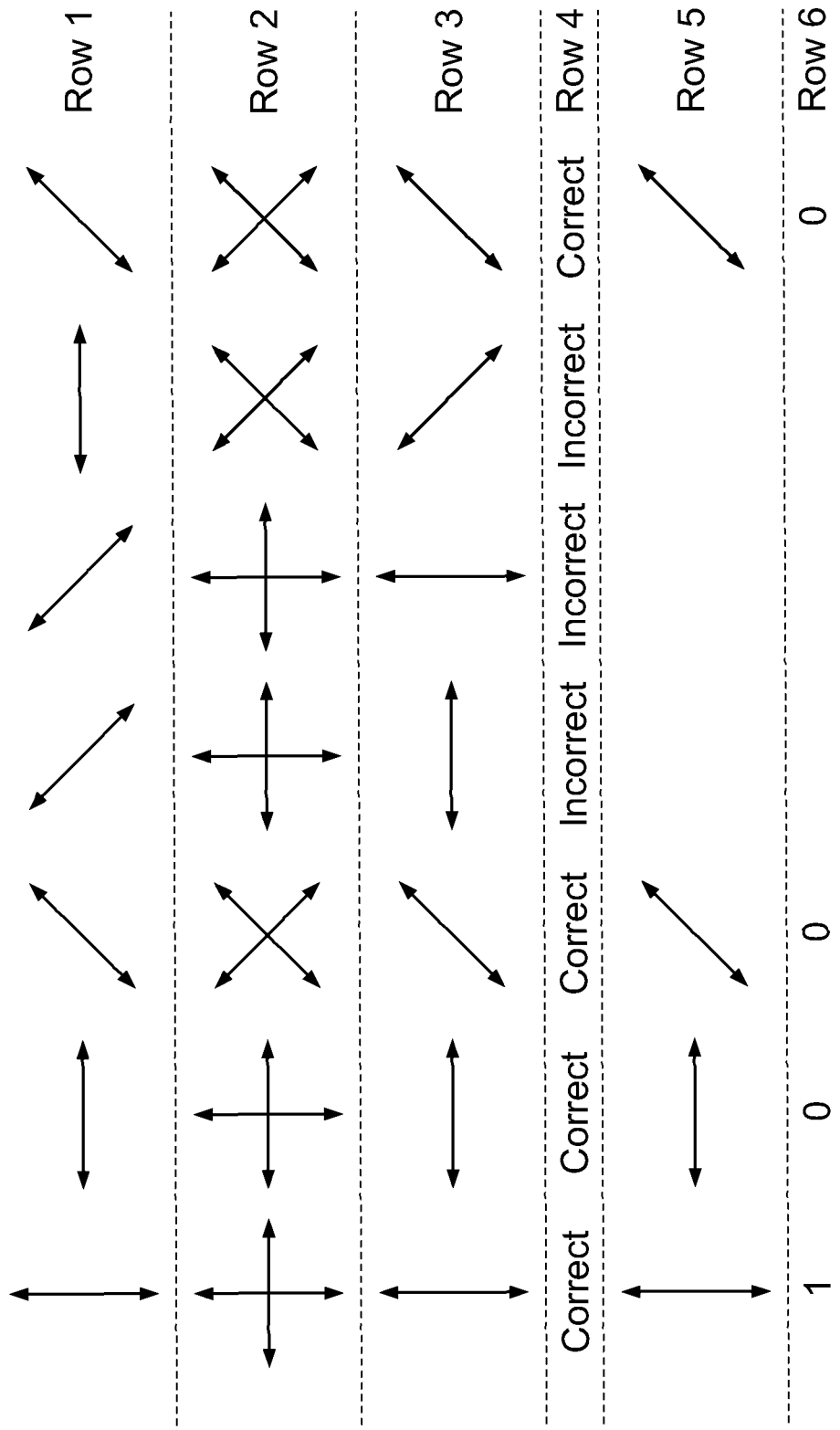
FIG. 3 illustrates conventional quantum cryptographic sifting and error correction.
Figure 4:
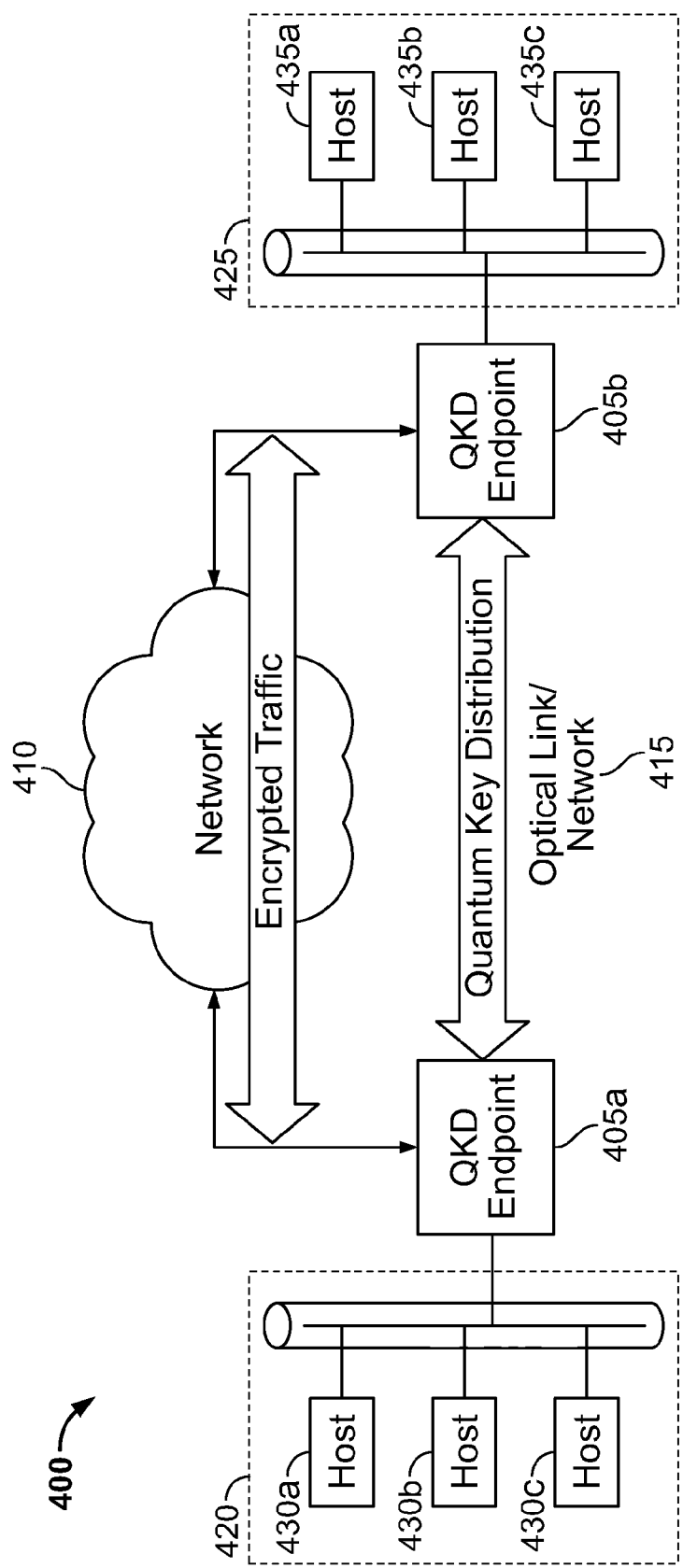
FIG. 4 illustrates an exemplary network in which systems and methods, according to an illustrative embodiment, may be implemented.

FIG. 4 illustrates an exemplary network 400 in which systems and methods, according to an illustrative embodiment, that distribute encryption keys via quantum cryptographic mechanisms can be implemented. Network 400 may include QKD endpoints 405a and 405b connected via a network 410 and an optical link/network 415. QKD endpoints 405a and 405b may each include a host or a server. QKD endpoints 405a and 405b may further connect to local area networks (LANs) 420 or 425. LANs 420 and 425 may further connect with hosts 430a-430c and 435a-435c, respectively. Network 410 can include one or more networks of any type, including a Public Land Mobile Network (PLMN), Public Switched Telephone Network (PSTN), LAN, metropolitan area network (MAN), wide area network (WAN), Internet, or Intranet. Network 410 may also include a dedicated fiber link or a dedicated freespace optical or radio link The one or more PLMNs may further include packet-switched sub-networks, such as, for example, General Packet Radio Service (GPRS), Cellular Digital Packet Data (CDPD), and Mobile IP subnetworks.

Optical link/network 415 may include a link that may carry light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, through the atmosphere or outer space, or even through water or other transparent media. As another alternative, the link may include a hollow optical fiber that may be lined with photonic band-gap material.

Furthermore, optical link/network 415 may include a QKD network that includes one or more QKD switches (not shown) for distributing encryption keys between a source QKD endpoint (e.g., QKD endpoint 405*a*) and a destination QKD endpoint (e.g., QKD endpoint 405*b*). Such a QKD network may include the QKD network described in U.S. patent application Ser. No. 09/943,709, entitled "Systems and Methods for Path Set-up in a Quantum Key Distribution Network," and U.S. patent application Ser. No. 09/944,328, entitled "Quantum Cryptographic Key Distribution Networks with Untrusted Switches."

QKD endpoints 405 may distribute Quantum Cryptographic keys via optical link/network 415. Subsequent to quantum key distribution via optical link/network 415, QKD endpoint 405*a* and QKD endpoint 405*b* may encrypt traffic using the distributed key(s) and transmit the traffic via network 410.

It will be appreciated that the number of components illustrated in FIG. 4 is provided for explanatory purposes only. A typical network may include more or fewer components that are illustrated in FIG. 4.

Exemplary QKD Endpoint

Figure 5:
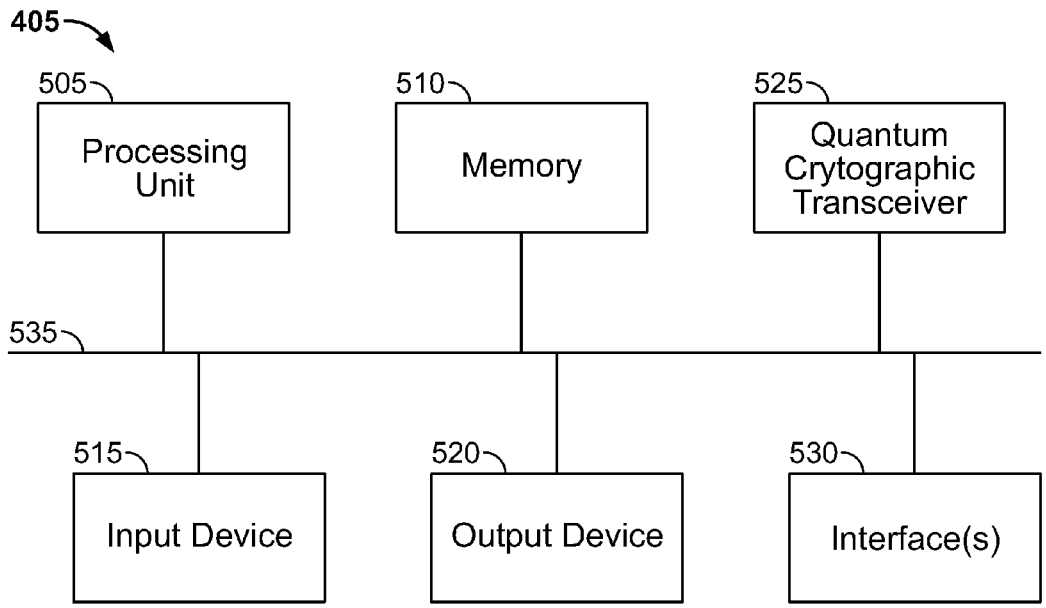
FIG. 5 illustrates an exemplary configuration of a QKD endpoint of FIG. 4 according to an illustrative embodiment.

FIG. 5 illustrates exemplary components of a QKD endpoint 405 according to an illustrative embodiment. QKD endpoint 405 may include a processing unit 505, a memory 510, an input device 515, an output device 520, a quantum cryptographic transceiver 525, an interface(s) 530 and a bus 535. Processing unit 505 may perform all data processing functions for inputting, outputting, and processing of QKD endpoint data. Memory 510 may include Random Access Memory (RAM) that provides temporary working storage of data and instructions for use by processing unit 505 in performing processing functions. Memory 510 may additionally include Read Only Memory (ROM) that provides permanent or semi-permanent storage of data and instructions for use by processing unit 505. Memory 510 can also include large-capacity storage devices, such as a magnetic and/or optical recording medium and its corresponding drive.

Input device 515 permits entry of data into QKD endpoint 405 and may include a user interface (not shown). Output device 520 permits the output of data in video, audio, and/or hard copy format. Quantum cryptographic transceiver 525 may include mechanisms for transmitting and receiving encryption keys using quantum cryptographic techniques. Interface(s) 530 may interconnect QKD endpoint 405 with link/network 415. Bus 535 interconnects the various components of QKD endpoint 405 to permit the components to communicate with one another.

Exemplary Quantum Cryptographic Transceiver

Figure 6:
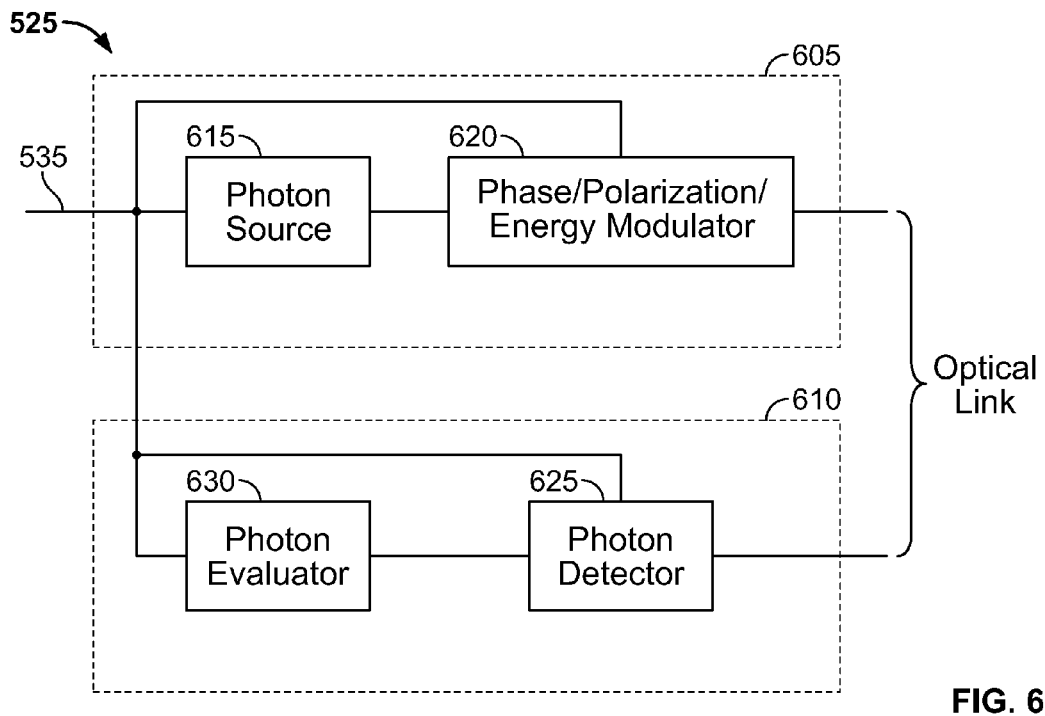
FIG. 6 illustrates exemplary components of the quantum cryptographic transceiver of FIG. 5 according to an illustrative embodiment.

FIG. 6 illustrates exemplary components of quantum cryptographic transceiver 525 of QKD endpoint 405 according to an illustrative embodiment. Quantum cryptographic transceiver 525 may include a QKD transmitter 605 and a QKD receiver 610, which may each contain, for example, one or more Mach-Zehnder and/or Sagnac interferometers. QKD transmitter 605 may include a photon source 615 and a phase/polarization/energy modulator 620. Photon source 615 can include, for example, a conventional laser. Photon source 615 may produce photons according to instructions provided by processing unit 505. Photon source 615 may produce photons of light with wavelengths throughout the electromagnetic spectrum, including light in the human visible spectrum and light beyond the human-visible spectrum, such as, for example, infrared or ultraviolet light. Phase/polarization/energy modulator 620 may encode outgoing photons from the photon source according to commands received from processing unit 505 for transmission across an optical link, such as link 415.

QKD receiver 610 may include a photon detector 625 and a photon evaluator 630. Photon detector 625 can include, for example, conventional avalanche photo detectors (APDs) or conventional photo-multiplier tubes (PMTs). Photon detector 625 can also include cryogenically cooled detectors that sense energy via changes in detector temperature or electrical resistivity as photons strike the detector apparatus. Photon detector 625 can detect photons received across the optical link Photon evaluator 630 can include conventional circuitry for processing and evaluating output signals from photon detector 625 in accordance with quantum cryptographic techniques.

Exemplary QKD Transmitter

Figure 7:
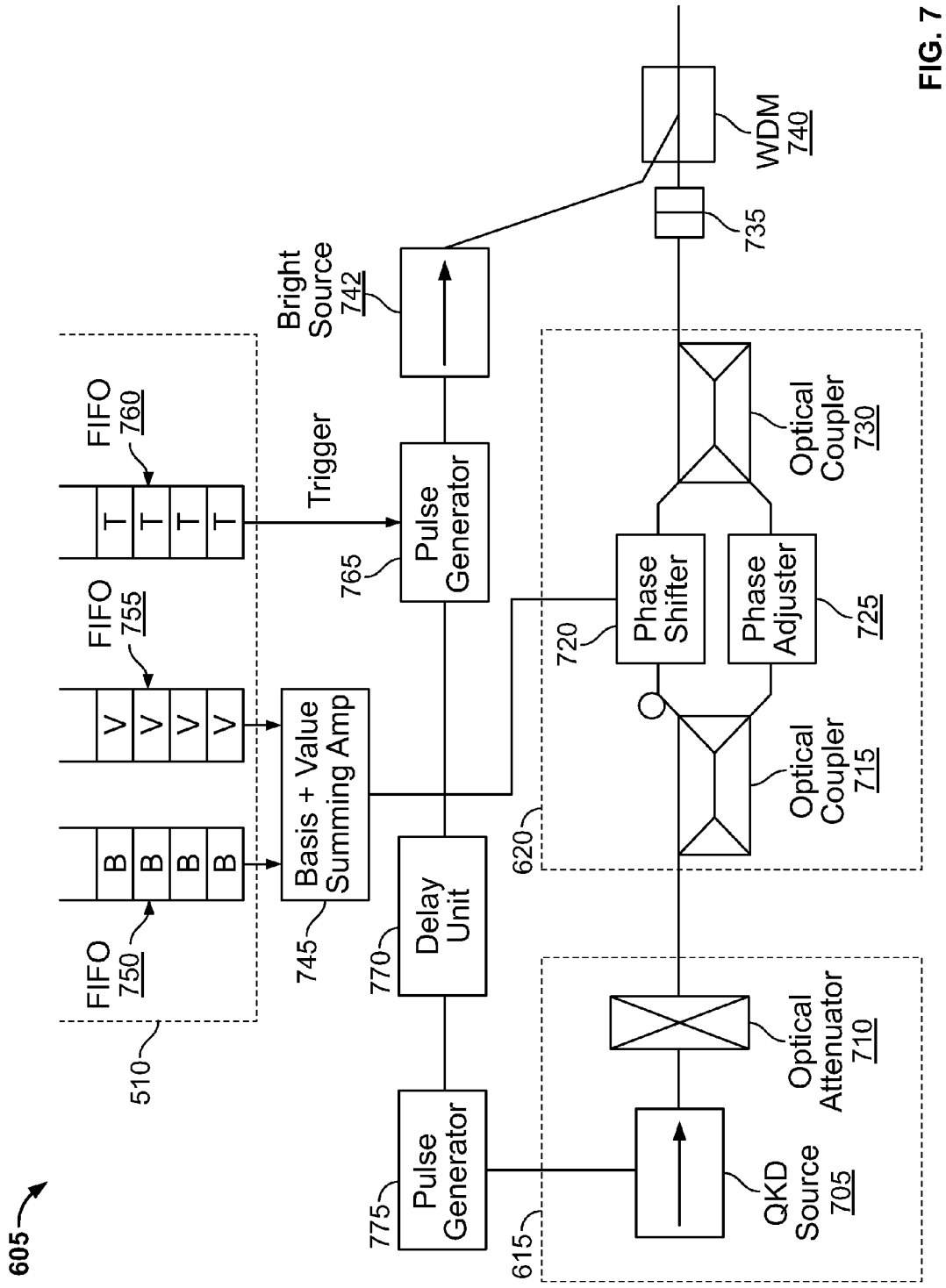
FIG. 7 illustrates exemplary components of the QKD transmitter of FIG. 6 according to an illustrative embodiment.

FIG. 7 illustrates exemplary components of QKD transmitter 605 according to an illustrative embodiment. QKD transmitter 605 may include one or more Mach-Zehnder and/or Sagnac interferometers. Photon source 615 of QKD transmitter 605 may include a QKD source 705 and an optical attenuator 710. Phase modulator 620 of QKD transmitter 605 may include an optical coupler 715, a phase shifter 720, a phase adjuster 725, and an optical coupler 730. QKD transmitter 605 may further include a fiber adapter 735, a wavelength division multiplexer (WDM) 740, a bright source 742, a summing amp 745, a pulse generator 765, a delay unit 770, and a pulse generator 775. As will be described below, QKD transmitter 605 may receive data from a group of first-in-first-out (FIFO) queues 750, 755 and 760 in memory 510.

QKD source 705 may include a laser that produces photon pulses at, for example, a 1550 nm wavelength. The number of photons contained in each photon pulse produced by QKD source 705 may be statistically distributed according to, for example, a Poisson distribution. According to such a statistical distribution, a series of photon pulses emitted by QKD source 705, when attenuated by optical attenuator 710, may include less than a threshold level of photons per pulse on average (e.g., less than 1 photon/pulse). Optical coupler 715 may include, for example, a 50/50 coupler, and may couple dim photon pulses from QKD source 705 to both phase shifter 720 and phase adjuster 725. Phase shifter 720 and phase adjuster 725 may be modulated to one of four phases to encode both a basis value and a cryptographic key symbol value in each photon's self interference. For example, a cryptographic key symbol of "0" or "1" may be encoded in either of two randomly selected non-orthogonal bases. In one implementation, the "0" key symbol can be encoded by either a phase shift of 0 (basis 0) or $\pi/2$ (basis 1) and the "1" key symbol can be encoded by either a $\pi$ phase shift (basis 0) or a $3\pi/2$ phase shift (basis 1). Four different basis and key symbol pairs (basis, symbol) may, thus, be encoded by four different phase shifts (0, π/2, π, or 3π/2). This may be achieved by applying four different voltages to phase shifter 720. These voltages may be applied by summing amp 745 which may convert a basis value B received from FIFO 750 and a cryptographic key value V received from FIFO 755 to one of four different voltages for inducing a corresponding phase shift in phase shifter 720. Phase adjuster 725 may maintain a stable path length during photon transmission and may maintain the identity of interferometers at QKD transmitter 605 and the receiving QKD receiver 610.

Optical coupler 730 may include, for example, a 50/50 coupler, and may couple the signals from phase shifter 720 and phase adjuster 725 to fiber adapter 735. Fiber adapter 735 may interconnect polarization maintaining fiber from optical coupler 730 to non-polarization maintaining fiber coupled to WDM 740. WDM 740 may multiplex the "dim" photon pulses from QKD source 705 with the "bright" photon pulses generated by bright source 742. Bright source 742 may include a laser that produces multi-photon pulses (e.g., "bright" pulses) at, for example, a 1300 nm wavelength.

A series of trigger values T may be received from FIFO 760 for triggering pulse generator 765. When triggered, pulse generator 765 may send a pulse to bright source 742 for initiating the transmission of a bright pulse, and a pulse to delay unit 770. Delay unit 770 may delay the pulse from pulse generator 765 a specified delay interval before passing the pulse on to pulse generator 775. Upon receipt of the delayed pulse, pulse generator 775 may send an electrical pulse to QKD source 705 for initiating the transmission of a photon pulse that may be attenuated by optical attenuator 710 to produce a dim photon pulse.

Exemplary QKD Receiver

Figure 8:
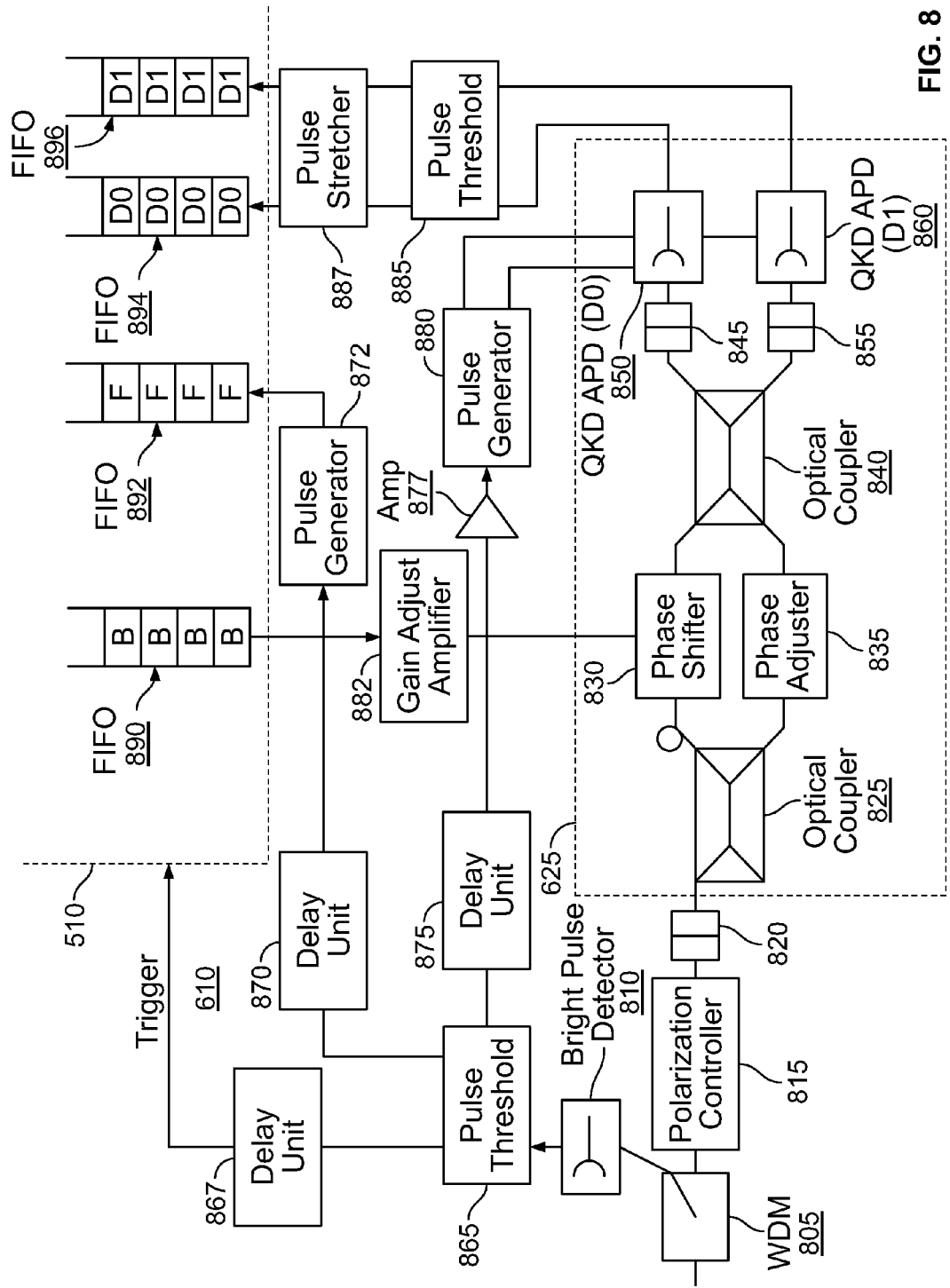
FIG. 8 illustrates exemplary components of the QKD receiver of FIG. 6 according to an illustrative embodiment.

FIG. 8 illustrates exemplary components of a QKD receiver 610 according to an illustrative embodiment. QKD receiver 610 may include one or more Mach-Zehnder and/or Sagnac interferometers. QKD receiver 610 may include a WDM 805, a bright pulse detector 810, a polarization controller 815, a fiber adapter 820, an optical coupler 825, a phase shifter 830, a phase adjuster 835, an optical coupler 840, a fiber adapter 845, a QKD APD 850 (labeled detector "D0"), a fiber adapter 855, and a QKD APD 860 (labeled detector "D1"). QKD receiver 610 may further include a pulse threshold device 865, delay units 867 and 870, a pulse generator 872, a delay unit 875, an amplifier 877, a pulse generator 880, a gain adjust amplifier 882, a pulse threshold device 885, and a pulse stretcher 887. Memory 510 may include multiple FIFO's 890, 892, 894 and 896.

WDM 805 may demultiplex optical pulses transmitted from a QKD transmitter 605 of another QKD endpoint 405. WDM 805 may, for example, demultiplex bright pulses received at 1300 nm wavelength to bright pulse detector 810. WDM 805 may further, for example, demultiplex dim pulses received at 1550 nm wavelength to polarization controller 815. Polarization controller 815 may adjust the polarization of incoming dim pulse photons, which have had their polarization altered by transit across link 415, such that the photons exhibit uniform polarization. Fiber adapter 820 may adapt non-polarization maintaining fiber coupled to polarization controller 815 to polarization maintaining fiber coupled to optical coupler 825. Optical coupler 825 may provide dim pulses to phase shifter 830 and phase adjuster 835. A phase shift may be randomly applied to phase shifter 830 via gain adjust amplifier 882. Gain adjust amplifier 882 may receive a basis value B from FIFO 890 indicating either a 0-π basis or a π/2-3π/2 basis. Gain adjust amplifier 882 may translate the basis value to an output voltage that adjusts the phase shift of phase shifter 830 an amount corresponding to the output voltage. Phase adjuster 835 may maintain a stable path length during photon transmission and reception and may maintain the identity of interferometers at QKD transmitter 605 and QKD receiver 610.

Optical coupler 840 may couple the signals from phase shifter 830 and phase adjuster 835 and provide the coupled signals to QKD APD 850 via fiber adapter 845, and to QKD APD 860 via fiber adapter 855. Fiber adapter 845 may adapt polarization maintaining fiber coupled to a port of optical coupler 840 to non-polarization maintaining fiber coupled to QKD APD 850. Fiber adapter 855 may adapt non-polarization maintaining fiber coupled to a port of optical coupler 840 to non-polarization maintaining fiber coupled to QKD APD 860.

Bright pulse detector 810 may pass an electrical annunciator pulse, indicating receipt of a bright photon pulse, to pulse threshold device 865. Pulse threshold device 865 may provide a logic pulse for each bright pulse received at detector 810 to trigger the gating of QKD APDs (D0) 850 and (D1) 860 via delay unit 875, amplifier 877 and pulse generator 880. Delay unit 875 may delay the logic pulse trigger from pulse threshold device 865 a sufficient interval such that QKD APDs (D0) 850 and (D1) 860 are gated precisely at a time a subsequent dim photon pulse arrives. At the receipt of a dim photon pulse at either QKD APD (D0) 850 or (D1) 860, the outputs of the APDs are sampled by pulse threshold device 885. Pulse threshold device 885 provides a pulse corresponding to each APD 850 and 860 if their sampled outputs meet a specified threshold value. Pulse stretcher 887 receives the corresponding pulse(s) from pulse threshold device 885 and converts the received pulses to a logic high symbol (i.e., a pulse is received) or a logic low symbol (i.e., no pulse is received). Logic high or low symbols corresponding to the output from QKD APD (D0) 850 may be provided to FIFO 894. Logic high or low symbols corresponding to the output from QKD APD (D1) 860 may be provided to FIFO 896.

Pulse threshold device 865 may further provide a logic pulse, corresponding to each received bright photon pulse, as a trigger to FIFOs 890, 892, 894 and 896 via delay unit 867. The trigger may "clock" data in or out of each of the FIFOs.

Pulse threshold device 865 may further provide a logic pulse, via delay unit 870, to trigger pulse generator 872. Pulse generator 872, responsive to a trigger pulse from pulse threshold device 865, may pass a framing symbol F to FIFO 892.

Exemplary Actively Stabilized QKD Interferometers

Figure 9:
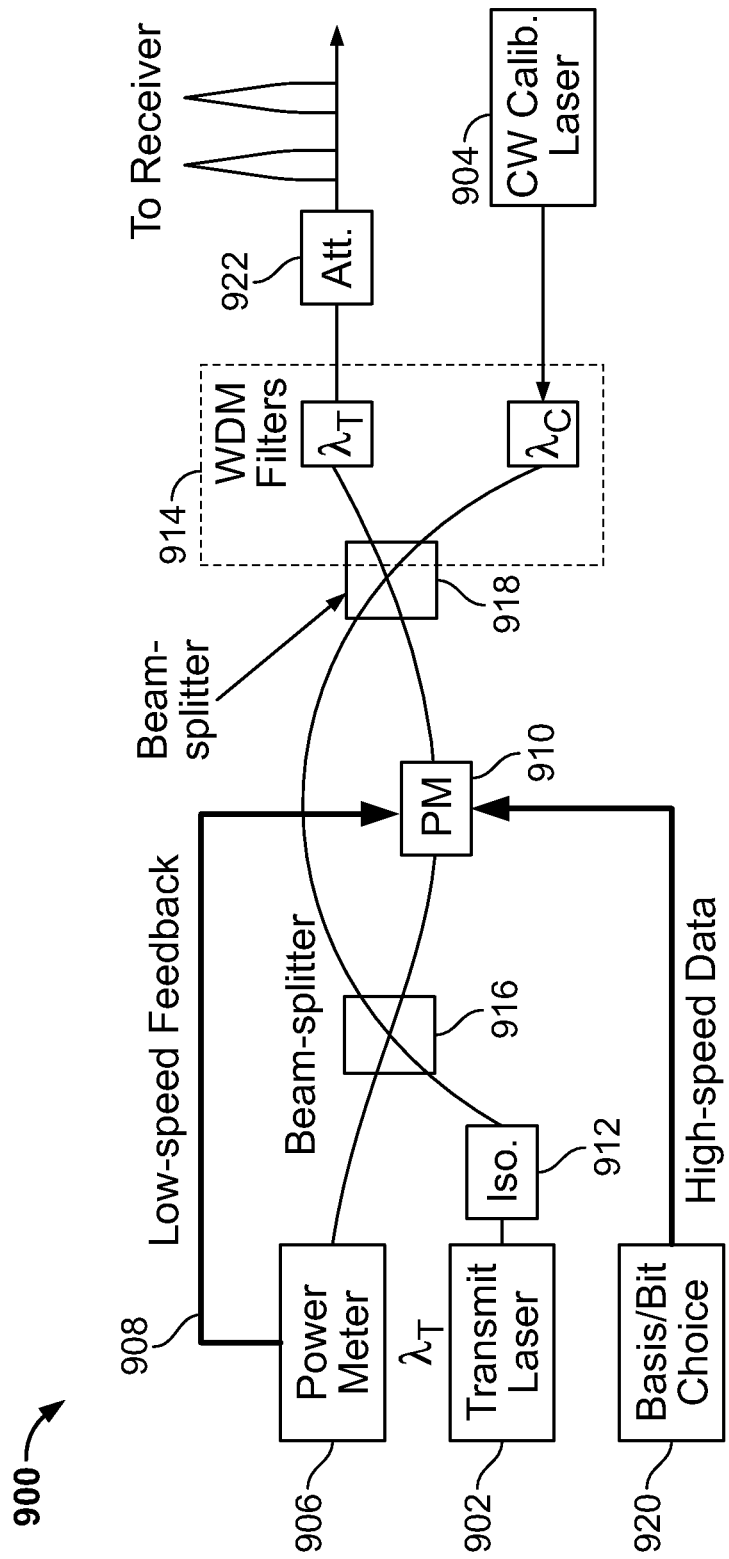
FIG. 9 is a diagram illustrating exemplary components of a QKD transmitter with an actively stabilized QKD transmitter interferometer and an exemplary technique for actively stabilized QKD interferometers according to an illustrative embodiment.

FIG. 9 is a diagram illustrating exemplary components of a QKD transmitter 900 with an actively stabilized QKD transmitter interferometer and an exemplary technique for actively stabilized QKD interferometers according to an illustrative embodiment. QKD transmitter 900 may include transmit laser 902, CW calibration laser 904, power meter 906, feedback signal 908, phase modulator 910, optical isolator 912, and wavelength division multiplexing filter 914. QKD transmitter 900 may also include beam-splitter 916, beam-splitter 918, basis/bit choice block 920, and attenuator 922. QKD transmitter 900 may make use of a transmitter interferometer with two paths/arms (e.g., a Mach-Zehnder Interferometer, MZI), as described above.

In operation, transmit laser 902 may produce photon pulses in a substantially similar manner as photon source 615 of FIG. 7, described above. Transmit laser 902 may produce photon pulses at a particular wavelength, $\lambda_T$. For example, transmit laser 902 may produce photon pulses at a 1550 nanometer wavelength. Transmit laser 902 may produce photon pulses that have a period of, for example, four nanoseconds. Photon pulses that have any wavelength or period may be produced by transmit laser 902.

CW calibration laser 904 may produce a calibration light signal (equivalently, calibration photon pulses or calibration pulses). CW calibration laser 904 may produce calibration pulses at a particular wavelength, $\lambda_C$. For example, CW calibration laser 904 may produce calibration pulses at a 1310 nanometer wavelength. CW calibration laser 904 may produce, for example, calibration pulses that have a period of one nanosecond. CW Calibration laser 904 may produce calibration pulses that have any wavelength or period. CW Calibration laser 904 may have a coherence time that is greater than L/c, where c is the speed of light in optical fiber and L is the path length associated with the transmitter interferometer. CW Calibration pulses may exit CW calibration laser 904 on the left and their power may be measured by power meter and/or sensor 906 after the pulses have traversed through the interferometer. In some embodiments, CW calibration laser 904 may be used in a QKD transmitter and in some embodiments, CW calibration laser 904 may be used in a QKD receiver and may operate in similarly or differently than described above.

Power meter 906 (or equivalently power sensor 906) may measure the intensity of received calibration pulses from CW calibration laser 904. Fluctuations in the intensity of received calibration pulses at the power meter may indicate a drift or fluctuation in the relative path lengths of the two transmitter interferometer paths. For example, the relative path lengths of the two paths/arms of the interferometer may drift unabated and errantly due to temperature fluctuations, vibration, and other such noise in the interferometer or the quantum channel. Power meter 906 may detect such a drift or fluctuation in the relative path lengths and may drive feedback signal 908. Feedback signal 908 may be used to drive and/or modulate phase modulator 910. Phase modulator 910 may be substantially similar to phase/polarization/energy modulator 620 of FIG. 7. Phase modulator 910 may encode outgoing photon pulses from transmit laser 902 based on the quantum bits to be transmitted on, for example, a quantum channel. Phase modulator 910 may be driven/modulated by feedback signal 908 from power meter 906. In particular, based on feedback signal 908, phase modulator 910 may adjust the length of one of the interferometer paths to compensate for drift in the relative path lengths of the two paths of the transmitter interferometer. Such an adjustment may advantageously substantially reduce or substantially eliminate drift between the path lengths of the two paths of the transmitter interferometer. In some embodiments, phase modulator 910 may be used in a QKD transmitter and in some embodiments, phase modulator 910 may be used in a QKD receiver and may operate in similarly or differently than described above.

Optical isolator 912 may be coupled to transmit laser 902 and may prevent calibration light pulses from CW calibration laser 904 or other unwanted light from reaching transmit laser 902. Wavelength division multiplexing filter 914 may be used to prevent calibration light pulses from CW calibration laser 904 from leaking into the quantum channel. In some embodiments, the transmitter 900 may include a controller, which may be integrated within and/or in communications with a component of the transmitter 900. The controller may include a processor for controlling one or more components or operations of the transmitter 900. The processor may include and/or interface with a memory including program instructions and/or code for implementing an application and/or algorithm associated with the operations of the transmitter 900. For example, the controller may receive a detected power signal from the power meter 906, processor the power signal, and generate the feedback signal 908 for effecting the operation of the phase modulator 910. In one embodiment, the controller may control the position of beam-splitter 916 and/or 918 to change to relative path lengths of the transmitter 900. Like the transmitter 900, the receiver 1100 and transmitter 1200 may include a controller to control one or more operations of each device.

Beam-splitter 916 and beam-splitter 918 may split light signals from transmit laser 902 and CW calibration laser 904, respectively. In an embodiment, an angle of beam-splitter 916 and/or beam-splitter 918 may be adjusted by power meter 906 or phase modulator 910 to adjust the length of one or both of the interferometer paths to reduce drift. Basis/bit choice block 920 may be used to choose a basis value to be encoded on photon pulses that may be generated by transmit laser 902. Attenuator 922 may attenuate the pulses it receives from wavelength division multiplexing filter 914 and/or the pulses it receives from transmit laser 902 and phase modulator 910.

Figure 10:
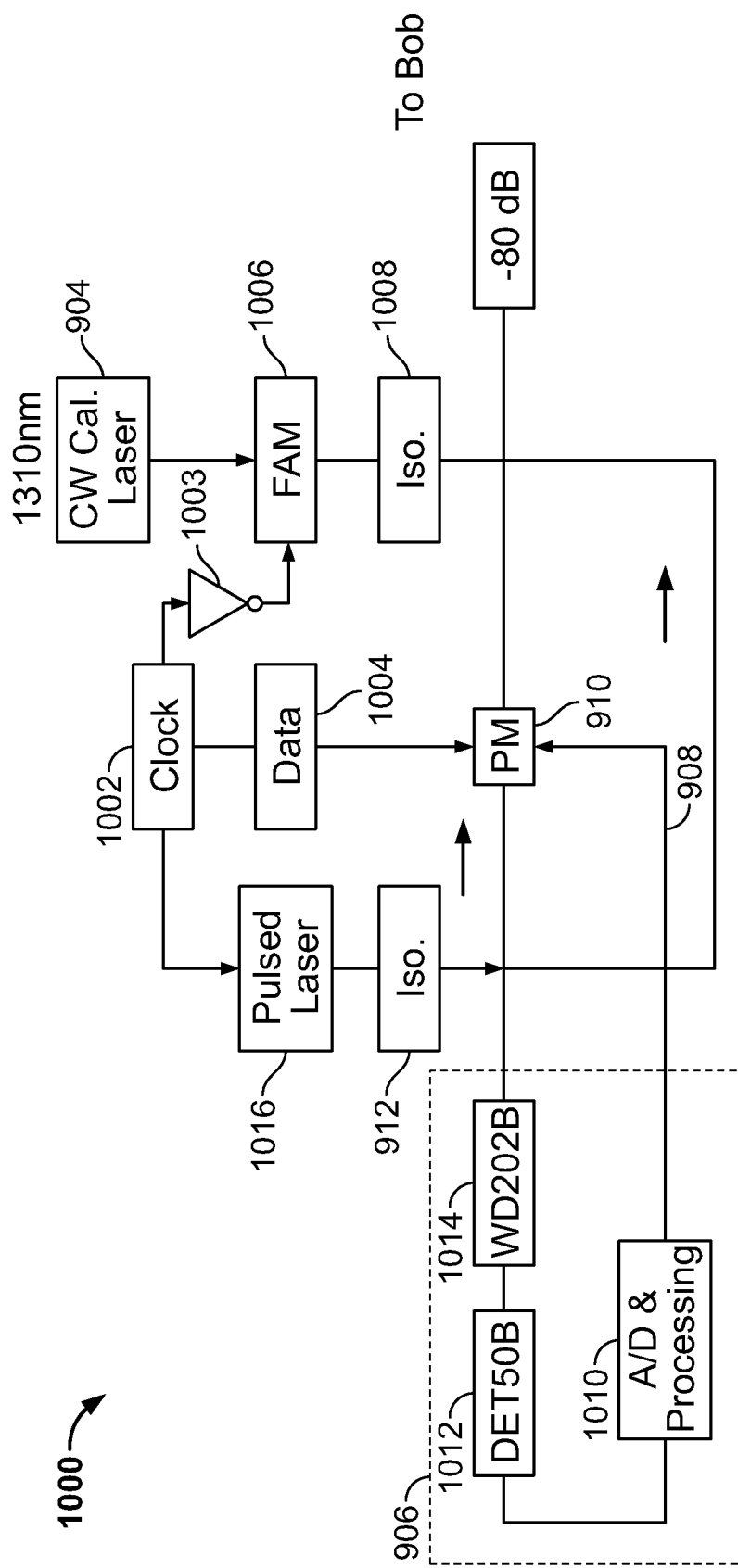
FIG. 10 is another diagram illustrating exemplary components of a QKD transmitter with an actively stabilized QKD transmitter interferometer according to an illustrative embodiment.

FIG. 10 is a block diagram illustrating exemplary components of QKD transmitter 1000 with an actively stabilized QKD transmitter interferometer according to an illustrative embodiment. QKD transmitter 1000 may include clock unit 1002, inverter 1003, data unit 1004, fiber amplitude modulator 1006, and optical isolator 1008. In addition, QKD transmitter 1000 may include CW calibration laser 904, power meter 906, feedback signal 908, phase modulator 910, and optical isolator 912, which may each function in a substantially similar way as described with reference to FIG. 9 above. Power meter and/or sensor 906 may include A/D processing unit 1010, detector 1012, and wavelength division multiplexing filter 1014. QKD transmitter 1000 may make use of a transmitter interferometer with two paths/arms (e.g., a Mach-Zehnder Interferometer, MZI), as described above.

In operation, clock unit 1002 may provide a clock signal to pulsed laser 1016 and to data unit 1004 and may provide an inverted clock signal, after being passed through inverter 1003 to fiber amplitude modulator 1006. Data unit 1004 may provide quantum bits to be encoded by phase modulator 910 and to be transmitted on, for example, a quantum channel. Fiber amplitude modulator 1006 may receive the clock signal from clock unit 1002 and a calibration light signal from CW calibration laser 904 and may periodically output calibration pulses, based on the period associated with the clock signal it receives from clock unit 1002. These pulses may exit fiber amplitude modulator 1006 and may be measured by power meter 906. Optical isolator 1008 may be coupled to fiber amplitude modulator 1006 and may prevent calibration light pulses from pulsed laser 1016 from reaching fiber amplitude modulator 1006 and/or CW calibration laser 904.

Pulsed laser 1016 may produce photon pulses in a substantially similar manner as photon source 615 of FIG. 7, described above. In addition, pulsed laser 1016 may receive the clock signal from clock unit 1002 and may use this clock signal to determine the period of transmitting or not transmitting photon pulses. Pulsed laser 1016 may produce photon pulses at a particular wavelength, $\lambda_T$. For example, pulsed laser 1016 may produce photon pulses at a 1550 nanometer wavelength. Pulsed laser 1016 may produce photon pulses that have a period of, for example, four nanoseconds. Photon pulses that have any wavelength or period may be produced by pulsed laser 1016. Photon pulses from pulsed laser 1016 may be time-multiplexed with calibration light pulses from CW calibration laser 904 and/or fiber amplitude modulator 1006 for low-speed quantum cryptographic transceivers (e.g., 1 MHz transceivers). By way of example, 1 nanosecond photon pulses may separated by 3 nanoseconds in a 1 microsecond clock slot. As another example, calibration light pulses may be about 1 microsecond in period and may be interleaved by 4 nanosecond photon pulses carrying encoded quantum bits.

Power meter 906 may include A/D processing unit 1010, detector 1012, and wavelength division multiplexing filter 1014. Detector 1012 may receive calibration light pulses from fiber amplitude modulator 1006 and/or CW calibration laser 904 and may recover information pertaining to a drift or fluctuation in the relative path lengths of the two transmitter interferometer paths. Detector 1012 may be used to amplify received calibration light pulses and may produce an analog signal reflective of the drift or fluctuation in the relative path lengths and output this analog signal as input into A/D processing unit 1010. The analog signal produced by detector 1012 may be, for example, directly proportional to the amount of drift. For example, if the drift is large, the amplitude of the analog signal produced by detector 1012 may also be large. For example, if the drift is small, the amplitude of the analog signal produced by detector 1012 may also be small. By way of example, detector 1012 may be a DET50B large area Ge detector. A/D processing unit 1010 may receive the analog signal from detector 1012 and may convert the analog signal to a digital signal (e.g., a voltage signal) to be input to phase modulator 910. Detector 1012 may be coupled to wavelength division multiplexing filter 1014, which may be used to prevent photon pulses from pulsed laser 1016 from being detected by detector 1012. By way of example, wavelength division multiplexing filter 1014 may be a WD202B wavelength division multiplexer.

Figure 11:
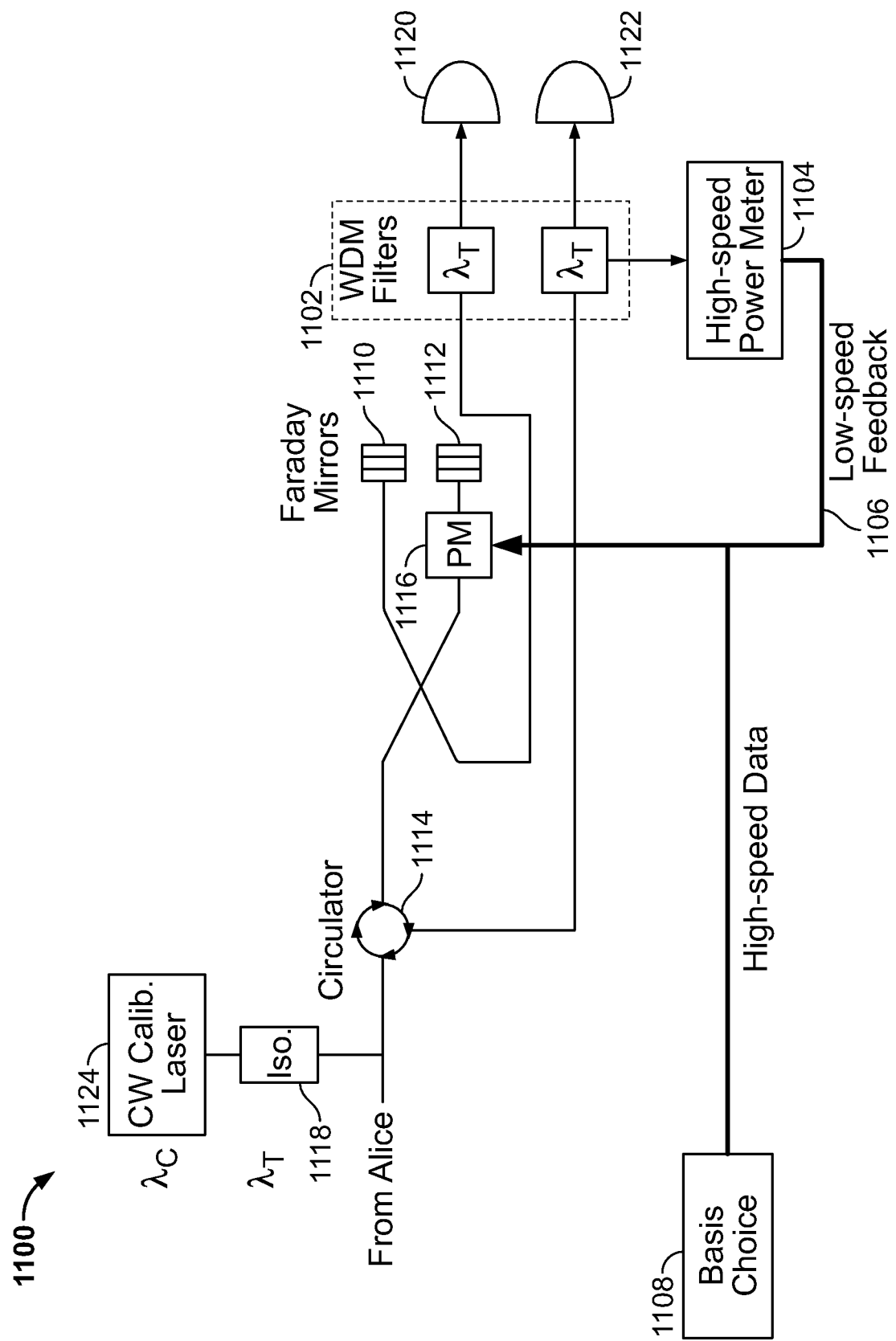
FIG. 11 is a diagram illustrating exemplary components of a QKD receiver with an actively stabilized QKD receiver interferometer according to an illustrative embodiment.

FIG. 11 is a diagram illustrating exemplary components of QKD receiver 1100 with an actively stabilized QKD receiver interferometer according to an illustrative embodiment. QKD receiver 1100 may include wavelength division multiplexing filter 1102, power meter 1104 (equivalently power sensor 1104), feedback signal 1106, basis choice block 1108, faraday mirrors 1110 and 1112, circulator 1114, phase modulator 1116, optical isolator 1118, and QKD APDs 1120 and 1122, and CW calibration laser 1124. QKD receiver 1100 may make use of a receiver interferometer with two paths/arms (e.g., a Mach-Zehnder Interferometer, MZI), as described above.

In operation, CW calibration laser 1124 may be similar to CW calibration laser 904 of FIG. 9. CW calibration laser 1124 may produce a calibration light signal (equivalently, calibration photon pulses or calibration pulses). CW calibration laser 1124 may produce calibration pulses at a particular wavelength, $\lambda_C$. For example, CW calibration laser 1124 may produce calibration pulses at a 1310 nanometer wavelength. CW calibration laser 1124 may produce, for example, calibration pulses that have a period of one nanosecond. CW Calibration laser 1124 may produce calibration pulses that have any wavelength or period. CW Calibration laser 1124 may have a coherence time that is greater than L/c, where c is the speed of light in optical fiber and L is the path length associated with the receiver interferometer. The calibration pulses output by CW calibration laser 1124 may traverse the interferometer and may be measured by power meter 1104. Optical isolator 1118 may be coupled to CW calibration laser 1124 and may prevent photon pulses from, the quantum channel, from reaching CW calibration laser 1124.

Power meter 1104 may measure the intensity of received calibration pulses from CW calibration laser 1124. Fluctuations in the intensity of received calibration pulses at power meter 1104 may indicate a drift or fluctuation in the relative path lengths of the two receiver interferometer paths. For example, the relative path lengths of the two paths/arms of the interferometer may drift unabated and errantly due to temperature fluctuations, vibration, and other such noise in the interferometer or the quantum channel. Power meter 1104 may detect such a drift or fluctuation in the relative path lengths and may drive feedback signal 1106. Power meter 1104 may operate at a high speed.

Feedback signal 1106 may be used to drive and/or modulate phase modulator 1116. Phase modulator 1116 may decode incoming encoded photon pulses from, for example, a QKD transmitter transmitting on a quantum channel. Encoded photon pulses of a particular wavelength, $\lambda_T$, or a of particular period, may be received and decoded based on, for example, a phase and/or a basis associated with the photon pulses. Circulator 1114 may also be used in decoding the photon pulses from the photon channel. In particular, circulator 1114 may circulate encoded photon pulses it receives from the quantum channel within the receiver interferometer. Phase modulator 1116 may be driven/modulated by feedback signal 1106 from power meter 1104. In particular, based on feedback signal 1106, phase modulator 1116 may adjust the length of one of the interferometer paths to compensate for drift in the relative path lengths of the two paths of the receiver interferometer. Such an adjustment may advantageously substantially reduce or substantially eliminate drift between the path lengths of the two paths of the receiver interferometer. In some embodiments, phase modulator 1116 may be used in a QKD transmitter and in some embodiments, phase modulator 1116 may be used in a QKD receiver and may operate in similarly or differently than described above.

Wavelength division multiplexing filter 1102 may be used to prevent calibration light pulses from CW calibration laser 1124 from leaking into QKD APDs 1120 and 1122. In addition, both time-division and wavelength division multiplexing may be used in receiver 1100 to prevent calibration light pulses from CW calibration laser 1124 from leaking into QKD APDs 1120 and 1122. QKD APDs 1120 and 1122 may be used to detect logic high or low decoded quantum bit information from photon pulses received by the QKD receiver. Faraday mirrors 1110 and 1112 may be used to rotate the polarization (e.g., by 90 degrees) of particular photon pulses that may be received by receiver 1100. Basis choice block 1108 may be used to choose a basis value with which to decode each photon pulse that may be received by receiver 1100.

Exemplary Passively Stabilized QKD Interferometers

Figure 12:
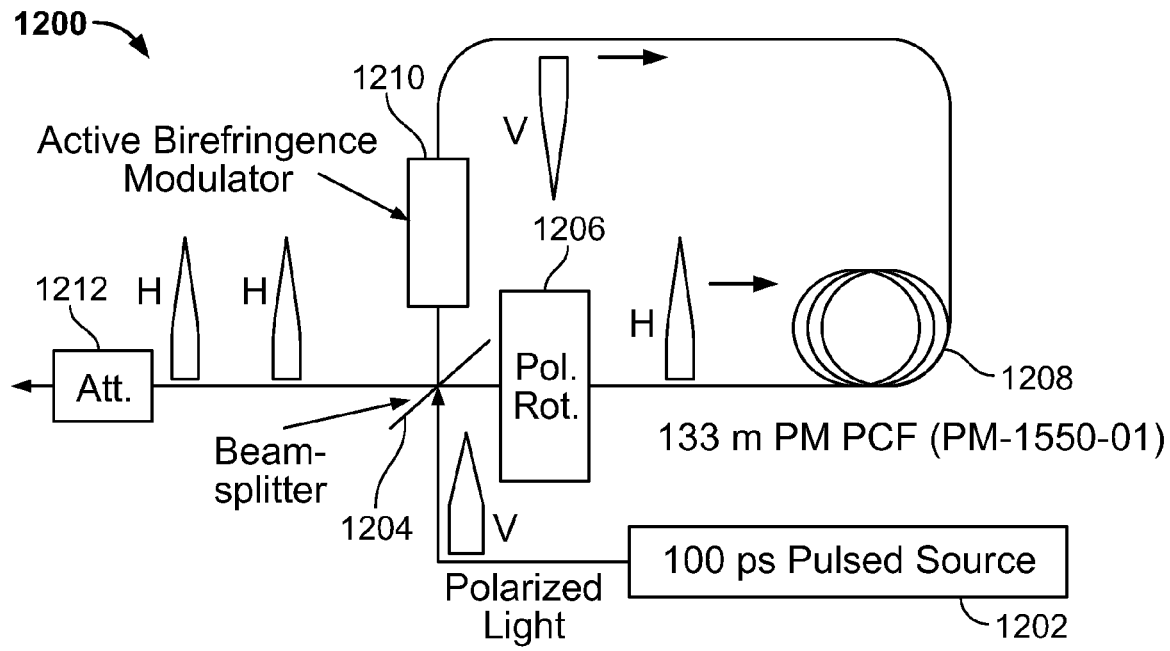
FIG. 12 is a diagram illustrating exemplary components of a QKD transmitter with a passively stabilized QKD transmitter interferometer according to an illustrative embodiment.

FIG. 12 is a diagram illustrating exemplary components of QKD transmitter 1200 with a passively stabilized QKD transmitter interferometer according to an illustrative embodiment. QKD transmitter 1200 may include pulsed laser 1202, non-polarizing beam-splitter 1204, polarization rotator 1206, polarization-maintaining photonic crystal fiber 1208, active birefringence modulator 1210, and attenuator 1212. QKD transmitter 1200 may make use of a transmitter interferometer with a single path/arm (e.g., using polarization-maintaining photonic crystal fiber 1208 in a Sagnac configuration or a Sagnac interferometer), as described above.

In operation, pulsed laser 1202 may produce photon pulses in a substantially similar manner as photon source 615 of FIG. 7, described above. In addition, pulsed laser 1202 may produce polarized photon pulses. Pulsed laser 1202 may produce photon pulses at a particular wavelength, $\lambda_T$. For example, pulsed laser 1202 may produce photon pulses at a 1550 nanometer wavelength. Pulsed laser 1202 may produce, for example, photon pulses that have a period of four nanoseconds. Photon pulses that have any wavelength or period may be produced by pulsed laser 1202.

A photon pulse, which may be generated by pulsed laser 1202 may be split by the non-polarizing beam-splitter 1204 into a clockwise rotating pulse and a counterclockwise rotating pulse around the transmitter interferometer. Non-polarizing beam-splitter 1204 may not change the polarization of a photon pulse it splits. The counterclockwise rotating pulse that is generated by non-polarizing beam-splitter 1204 may be input to polarization rotator 1206. The clockwise rotating pulse that is generated by non-polarizing beam-splitter 1204 may be input to polarization-maintaining photonic crystal fiber 1208. Polarization rotator 1206 may rotate the polarization of the counterclockwise rotating pulse, for example, by 90 degrees, and may input this (rotated, polarized) counterclockwise rotating pulse to polarization-maintaining photonic crystal fiber 1208. By rotating the counterclockwise rotating pulse (e.g., by 90 degrees), polarization rotator 1206 may allow the counterclockwise rotating pulse to be orthogonal to the clockwise rotating pulse produced by non-polarizing beam-splitter 1204. Polarization rotator 1206 may have losses of about −1.0 decibels (dB).

Polarization-maintaining photonic crystal fiber 1208 may be in a Sagnac configuration (i.e., a Sagnac loop configuration) and may have a fast axis and a slow axis. Polarization-maintaining photonic crystal fiber 1208 may have a high birefringence and may be at least 100 meters to achieve 300 picoseconds separation of 100 picoseconds photon pulses (i.e., to achieve a desired period between photon pulses transmitted in a quantum channel). For systems that make use of photonic crystal fibers of a higher birefringence, photonic crystal fibers of a higher birefringence may be at least, for example, 0.1, 1, 10, 15, 25, 75, 100, or 133 meters to achieve the desired period between photon pulses transmitted in a quantum channel.

Polarization-maintaining photonic crystal fiber 1208 may receive both the counterclockwise rotating pulse with its polarization rotated (e.g., by 90 degrees) and the clockwise rotating pulse. These rotating pulses may be aligned by polarization-maintaining photonic crystal fiber 1208 along its fast and slow axes. This may allow one of the two rotating pulses to have a delay relative to the other of the two rotating pulses. Such a delay may be advantageous for encoding quantum bits using the phase of photon pulses. The two pulses may then be input to active birefringence modulator 1210. Polarization-maintaining photonic crystal fiber 1208 may have losses of about −0.13 dB.

Active birefringence modulator 1210 may encode, on one of the counterclockwise rotating pulse with its polarization rotated (e.g., by 90 degrees) and the clockwise rotating pulse, a phase associated with the quantum bit to be transmitted on a quantum channel. The other of the two pulses, which is not encoded by a phase, may be left un-shifted in terms of its phase. Active birefringence modulator 1210 may have losses of −0.5 dB. Active birefringence modulator 1210 may make use of high-speed methods. By way of example, active birefringence modulator 1210 may be a lithium niobate active birefringence modulator and may make use of a liquid crystal variable retarder (LCVR) or fiber squeezing for encoding quantum bits. The two pulses may exit the Sagnac loop and may be input to attenuator 1212. Attenuator 1212 may attenuate the two pulses to single photon levels for subsequent transmission to a QKD receiver. Attenuator 1212 may have losses of about −80 dB.

Exemplary Active Stabilization of Interferometers

Figure 13:
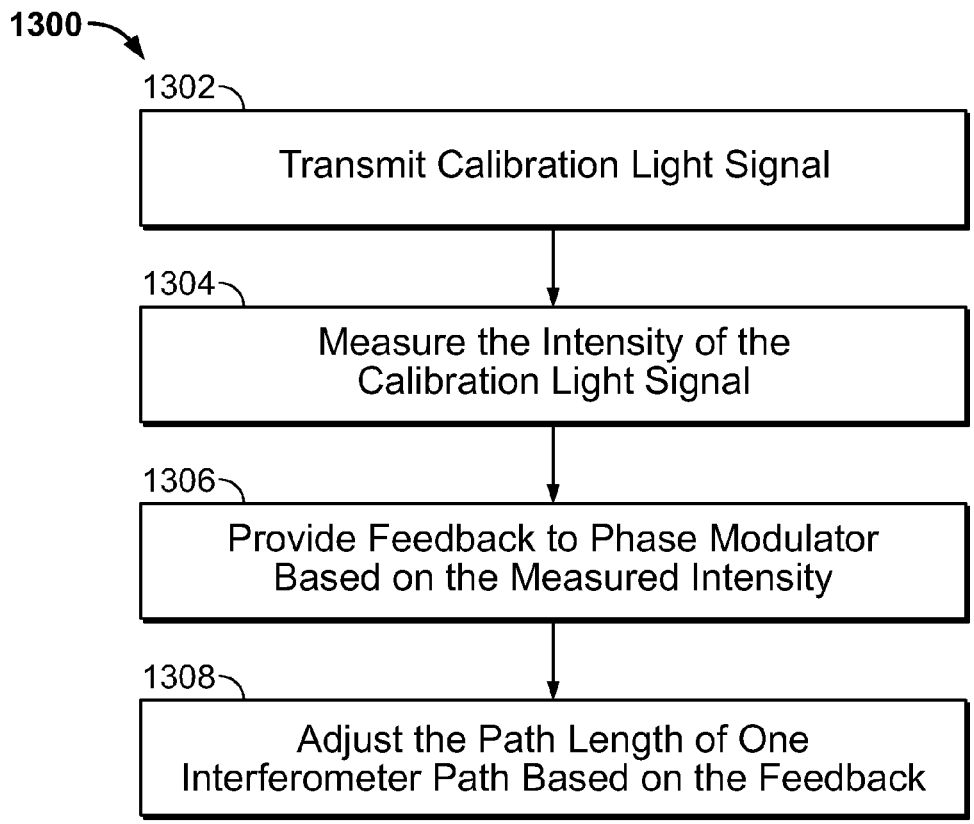
FIG. 13 is a flow chart that illustrates an exemplary process for active stabilization of QKD interferometers according to an illustrative embodiment.

FIG. 13 is a flow chart that illustrates exemplary process 1300 for active stabilization of QKD interferometers according to an illustrative embodiment. Process 1300 includes steps 1302, 1304, 1306, and 1308. In some embodiments, process 1300 may be used in components of transceivers and transceiver interferometers (e.g., a two-path/two-arm interferometer, such as a Mach-Zehnder interferometer). In some embodiments, process 1300 may be used to efficiently reduce drift in relative path lengths within, for example, two-path interferometers, caused by, for example, temperature fluctuations or vibrations.

At step 1302, a calibration laser (e.g. CW calibration laser 904, of FIG. 9) may transmit a calibration light signal (equivalently, calibration photon pulses or calibration pulses). For example, the calibration laser may produce calibration pulses of a particular wavelength, $\lambda_C$, or of a particular period. The calibration pulses may then be transmitted through the interferometer to a power meter/sensor (e.g., power meter 906). Step 1304 may then be executed.

At step 1304, the intensity of the calibration light signal may be measured by the power meter/sensor (e.g., power meter 906). Fluctuations in the intensity of received calibration pulses at the power meter may indicate a drift or fluctuation in the relative path lengths of the two transmitter interferometer paths. For example, the relative path lengths of the two paths/arms of the interferometer may drift unabated and errantly due to temperature fluctuations, vibration, and other such noise in the interferometer or the quantum channel. The power meter may detect such a drift or fluctuation in the relative path lengths, based on the measured intensity of the calibration light signal, and may drive a feedback signal (e.g., feedback signal 908) which may be used to drive/modulate a phase modulator (e.g., phase modulator 908). Step 1306 may then be executed.

At step 1306, the feedback signal (e.g., feedback signal 908) may be provided to the phase modulator (e.g., phase modulator 908). The feedback signal may be used drive/modulate the phase modulator. The feedback signal may be, for example, directly proportional to the amount of drift, detected at step 1304, and based on the intensity of received calibration pulses at the power meter/sensor. For example, if the drift is large, the amplitude of the feedback signal may also be large. For example, if the drift is small, the amplitude of the feedback signal may also be small. Step 1308 may then be executed.

At step 1308, the phase modulator may adjust the length of one of the two interferometer paths, based on the feedback signal (e.g., feedback signal 908), to compensate for the drift in the relative path lengths of the paths. Such compensation may substantially reduce or substantially eliminate drift in relative path lengths within, for example, two-path interferometers, which may allow for better performance of quantum cryptographic transceivers when quantum bits encoded on photons are being transmitted or received.

It should be understood that the above steps of process 1300 may be executed or performed in any order or sequence not limited to the order and sequence shown and described in the figure. Also, some of the above steps of process 1300 may be executed or performed substantially simultaneously where appropriate or in parallel to reduce latency and processing times.

Exemplary Passive Stabilization of Interferometers

Figure 14:
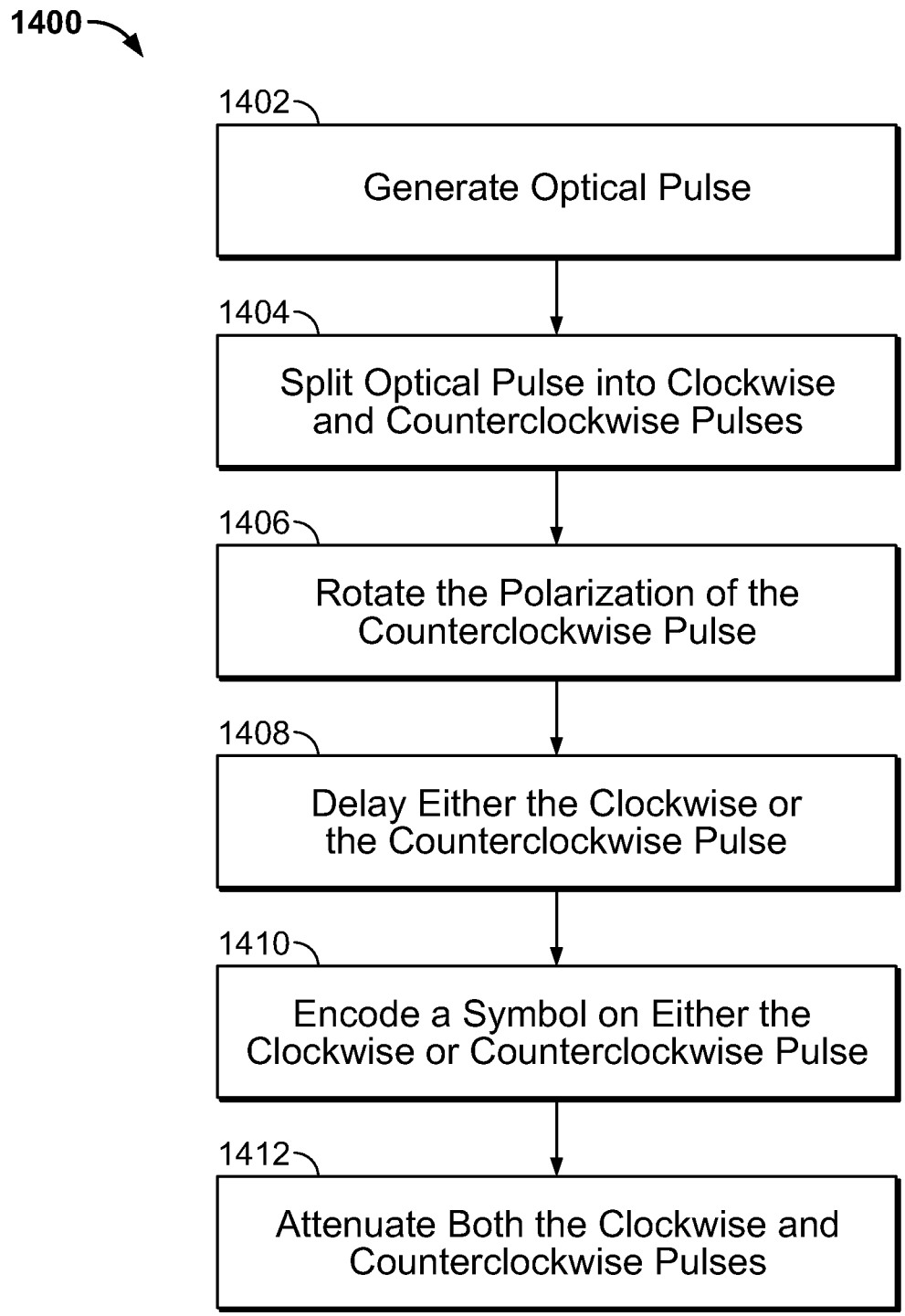
FIG. 14 is a flow chart that illustrates an exemplary process for passive stabilization of QKD interferometers according to an illustrative embodiment.

FIG. 14 is a flow chart that illustrates exemplary process 1400 for passive stabilization of QKD interferometers according to an illustrative embodiment. Process 1400 includes steps 1402, 1404, 1406, 1408, 1410, and 1412. In some embodiments, process 1400 may be used in components of transceivers and transceiver interferometers (e.g., a single-path Sagnac transmitter interferometer), such as those described above. In some embodiments, process 1400 may be used to substantially reduce or substantially eliminate drift in the relative path lengths, may be present in two-path interferometers (e.g. a Mach-Zehnder interferometer) by making use of a single-path interferometer (e.g. a Sagnac interferometer).

At step 1402, a pulsed laser source (e.g., pulsed laser 1202 of FIG. 12) may generate a optical/photon pulse. For example, a polarized photon pulse with a particular wavelength, $\lambda_T$, or particular period may be generated. Step 1404 may then be executed.

At step 1404, the photon pulse may be split by a non-polarizing beam-splitter (e.g. non-polarizing beam-splitter 1204 of FIG. 12) into a clockwise rotating pulse and a counterclockwise rotating pulse around a transmitter interferometer (e.g., around the interferometer shown in QKD transmitter 1200 of FIG. 12). The counterclockwise rotating pulse that is generated by the non-polarizing beam-splitter at step 1404 may be input to a polarization rotator (e.g., polarization rotator 1206 of FIG. 12). The clockwise rotating pulse that is generated by non-polarizing beam-splitter at step 1404 may be input to a polarization-maintaining photonic crystal fiber (e.g., polarization-maintaining photonic crystal fiber 1208 of FIG. 12). Step 1406 may then be executed.

At step 1406, the polarization of the counterclockwise rotating pulse may be rotated (e.g., by 90 degrees) by the polarization rotator (e.g., polarization rotator 1206 of FIG. 12). This may then allow the counterclockwise rotating pulse to be orthogonal to the clockwise rotating pulse. The counterclockwise rotating pulse, with its polarization rotated (e.g., by 90 degrees), may then be input to the a polarization-maintaining photonic crystal fiber. Step 1408 may then be executed.

At step 1408, one of the two rotating pulses from may be delayed relative to the other of the two rotating pulses. This delaying may be performed by the polarization-maintaining photonic crystal fiber (e.g., polarization-maintaining photonic crystal fiber 1208 of FIG. 12) by aligning each of the two rotating pulses along either its fast or its slow axes. Such a delay may be advantageous for encoding quantum bits using the phase of photon pulses. The two rotating pulses are then input to an active birefringence modulator (e.g., active birefringence modulator 1210 of FIG. 12). Step 1410 may then be executed.

At step 1410, a symbol, such as a quantum bit may be encoded on either the clockwise rotating pulse or counterclockwise rotating pulse with its polarization rotated (e.g., by 90 degrees) by the active birefringence modulator (e.g., active birefringence modulator 1210 of FIG. 12). This may be accomplished by shifting the phase of the pulse on which the symbol is to be encoded. The other of the two pulses, which is not encoded with a symbol may be left un-shifted in terms of phase. The two pulses may then be input to an attenuator (e.g., attenuator 1212 of FIG. 12). Step 1412 may then be executed.

At step 1412, both of the two pulses may be attenuated by an attenuator (e.g., attenuator 1212 of FIG. 12) for transmission to, for example, a QKD receiver.

It should be understood that the above steps of process 1400 may be executed or performed in any order or sequence not limited to the order and sequence shown and described in the figure. Also, some of the above steps of process 1400 may be executed or performed substantially simultaneously where appropriate or in parallel to reduce latency and processing times.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a phase modulator has been described for use in transmitters 900, 1000, and 1200, receiver 1100 and process 1300, this element may be replaced by any path length adjustment element. The path length adjustment element may be adjusted by the various feedback signals discussed with reference to transmitters 900, 1000, and 1200, receiver 1100 and process 1300. The path length adjustment element may adjust one or both of the path lengths associated with transmitters 900, 1000, and 1200, receiver 1100 and/or discussed with reference to process 1300. For example, the path length adjustment element may be a fiber delay line that may be adjusted. While certain components of the invention have been described as implemented in hardware and others in software, other configurations may be possible. Furthermore, while wavelength division multiplexing has been described above, time division multiplexing may be used, alternatively, or in conjunction with wavelength division multiplexing, for transmitting pulses over the quantum cryptographic link Additionally, while exemplary embodiments of the present invention have been described as using optical QKD pulses (i.e., photon pulses) for encoding and transmitting cryptographic keys, it will be appreciated that other non-optical pulses that include, for example, individual atoms, electrons, etc., may alternatively be used. In embodiments employing non-optical pulses, the individual quantum particles (e.g., atoms, electrons) may be modulated to encode cryptographic key symbols.

While series of steps has been described with regard to FIGS. 13 and 14, the order of the acts may vary in other implementations according to an illustrative embodiment. Also, non-dependent acts may be performed in parallel. No element, act, or instruction used in the description of the present application should be construed as critical or essential to the invention unless explicitly described as such. Also, as used herein, the article "a" is intended to include one or more items. The scope of the invention is defined by the following claims and their equivalents.

What is claimed is:

1. A quantum cryptographic key distribution system comprising:
   a pulsed laser source arranged to transmit a pulse; and
   an interferometer including:
      a non-polarizing beam splitter configured to split the pulse into a clockwise pulse and a counterclockwise pulse;
      a polarization rotator configured to rotate a polarization of the counterclockwise pulse to produce a polarized counterclockwise pulse;
      a polarization-maintaining photonic crystal fiber configured to delay one of the clockwise pulse and the polarized counterclockwise pulse relative to the other one of the clockwise pulse and the polarized counterclockwise pulse; and
      an active birefringence modulator to phase encode a symbol on one of the clockwise pulse and the polarized counterclockwise pulse;

wherein each of the clockwise and counterclockwise pulses are output as one of a phase-encoded pulse and reference pulse.

2. The system of claim 1, wherein phase-encoded pulse and reference pulse are output at a substantially constant phase difference.

3. The system of claim 1, wherein the polarization-maintaining photonic crystal fiber is further configured to align each of the clockwise pulse and the polarized counterclockwise pulse along one of a fast axis and a slow axis.

4. The system of claim 1, wherein the polarization of the counterclockwise pulse is orthogonal to a polarization of the clockwise pulse.

5. The system of claim 1, wherein the polarization of the counterclockwise pulse is rotated by 90 degrees.

6. The system of claim 1, comprising an attenuator configured to attenuate each of the clockwise pulse and the polarized counterclockwise pulse.

7. The system of claim 1, wherein the polarization-maintaining photonic crystal fiber has high birefringence.

8. The system of claim 1, wherein the polarization-maintaining photonic crystal fiber has a length that is greater than 100 meters.

9. The system of claim 1, wherein the phase-encoded pulse includes information for deriving a cryptographic key.

10. The system of claim 1, wherein the interferometer includes a Sagnac interferometer.

11. A method for quantum cryptographic key distribution, comprising:
   transmitting a pulse using a pulsed laser source; and
   using an interferometer for:
      splitting the pulse into a clockwise pulse and a counterclockwise pulse, using a non-polarizing beam splitter;
      rotating a polarization of the counterclockwise pulse to produce a polarized counterclockwise pulse, using a polarization rotator;
      delaying one of the clockwise pulse and the polarized counterclockwise pulse relative to the other one of the clockwise pulse and the polarized counterclockwise pulse, using a polarization-maintaining photonic crystal fiber; and
      phase encoding a symbol on one of the clockwise pulse and the polarized counterclockwise pulse, using an active birefringence modulator;
      wherein each of the clockwise and counterclockwise pulses are output as one of a phase-encoded pulse and reference pulse.

12. The method of claim 11, comprising outputting the phase-encoded pulse and reference pulse at a substantially constant phase difference.

13. The method of claim 11 comprising aligning each of the clockwise pulse and the polarized counterclockwise pulse along one of a fast axis and a slow axis, using the polarization-maintaining photonic crystal fiber.

14. The method of claim 11, wherein the polarization of the counterclockwise pulse is orthogonal to a polarization of the clockwise pulse.

15. The method of claim 11, wherein the polarization of the counterclockwise pulse is rotated by 90 degrees.

16. The method of claim 11 comprising attenuating each of the clockwise pulse and the polarized counterclockwise pulse, using an attenuator.

17. The method of claim 11, wherein the polarization-maintaining photonic crystal fiber has high birefringence.

18. The method of claim 11, wherein the polarization-maintaining photonic crystal fiber has a length that is greater than 100 meters.

19. The method of claim 11, wherein the phase-encoded pulse includes information for deriving a cryptographic key.

20. The method of claim 11, wherein the interferometer includes a Sagnac interferometer.

* * * * *